United States Patent [19]
Asada et al.

[11] Patent Number: 5,745,207
[45] Date of Patent: Apr. 28, 1998

[54] ACTIVE MATRIX LIQUID CRYSTAL DISPLAY HAVING ELECTRIC FIELDS PARALLEL TO SUBSTRATES

[75] Inventors: Satoshi Asada; Yoneharu Takubo; Mitsuhiro Uno, all of Ishikawa, Japan

[73] Assignee: Matsushita Electric Industrial Co., Ltd., Osaka, Japan

[21] Appl. No.: 757,160

[22] Filed: Nov. 27, 1996

[30] Foreign Application Priority Data

Nov. 30, 1995 [JP] Japan .................................. 7-312010
Sep. 20, 1996 [JP] Japan .................................. 8-250468

[51] Int. Cl.$^6$ .......................... G02F 1/1343; G02F 1/139
[52] U.S. Cl. ........................ 349/141; 349/42; 349/145; 349/178
[58] Field of Search ............................. 349/42, 43, 139, 349/141, 144, 145, 146, 178, 177; 345/87, 90, 92

[56] References Cited

U.S. PATENT DOCUMENTS

| | | | |
|---|---|---|---|
| 5,434,690 | 7/1995 | Hisatako et al. | 349/143 |
| 5,576,867 | 11/1996 | Baur et al. | 349/142 |
| 5,598,285 | 1/1997 | Kondo et al. | 349/39 |
| 5,600,464 | 2/1997 | Oho et al. | 349/138 |

Primary Examiner—William L. Sikes
Assistant Examiner—Tai V. Duong
Attorney, Agent, or Firm—Merchant, Gould, Smith, Edell, Welter & Schmidt, P.A.

[57] ABSTRACT

In an active matrix liquid crystal display, common electrodes and pixel electrodes are respectively formed parallel to each other and have substantially herringbone shapes. Areas of first display regions formed between the common electrodes and the pixel electrodes and disposed at one side of the inflection points of the herringbone shapes are substantially the same as those of second display regions disposed at the other side. When electric fields substantially parallel to surface of an array substrate are applied between the pixel electrodes and the common electrodes, orientations of liquid crystal molecules in the first and second display regions move in opposite directions. Coloring of image corresponding to angle of view due to the movement of the orientation of the liquid crystal molecules is compensated.

15 Claims, 7 Drawing Sheets

ACTIVE MATRIX LIQUID CRYSTAL DISPLAY HAVING ELECTRIC FIELDS PARALLEL TO SUBSTRATES

FIELD OF THE INVENTION

This invention relates to a liquid crystal display which is used as a flat display for audio-visual equipment and office automation equipment, and especially relates to an active matrix liquid crystal display in which electric fields are applied substantially parallel to a surface of a thin film transistor array substrate.

DESCRIPTION OF THE PRIOR ART

The liquid crystal display is conventionally used in many fields such as a view finder of a video camera, a display of a compact television set (TV), a spatial light modulator of a high-resolution projection TV, and an information display terminal of a personal computer or a word processor. In an active matrix type twisted nematic liquid crystal display, thin film transistors are used as switching devices. Thus, the twisted nematic liquid crystal display is advantageous in that high contrast image can be displayed even when mass strage image data are displayed. On the other hand, a lap-top personal computer, a note book type personal computer, an engineering work station, and so on are demanded in the market in recent years. The twisted nematic liquid crystal display is expected to be used as a large sized and mass stragous full-color display device for these equipments.

In the active matrix twisted nematic liquid crystal display, the normally white mode is generally used. The conventional active matrix twisted nematic liquid crystal display has a configuration in which a liquid crystal layer is disposed between two transparent electrodes on transparent substrates, the orientation of liquid crystal molecules in the vicinity of one electrode is twisted 90 degrees from the orientation of liquid crystal molecules in the vicinity of the other electrode in the liquid crystal layer, and the transparent substrates with the electrodes and the liquid crystal layer are disposed between two polarizing plates.

In the normally white mode of the conventional active matrix twisted nematic liquid crystal display, the polarizing axes of the polarizing plates cross each other at right angles. The polarizing axis of one of the polarizing plates is oriented parallel to or alternatively perpendicular to the major axis of the liquid crystal molecules in the vicinity of the polarizing plate. When no voltage or a voltage lower than a predetermined threshold value is applied between the electrodes, the liquid crystal display is in the white display mode. When the voltage applied between the electrodes gradually increases above the predetermined threshold value, the transmittance of light through the liquid crystal display gradually reduces and finally the liquid crystal display is in the black display mode. When the voltage is applied between the electrodes, the liquid crystal molecules move in the liquid crystal layer to release the twisted configuration and to orient along the direction of electric field. Corresponding to the orientation of the liquid crystal molecules, polarization of transmitted light through the liquid crystal display changes. As a result, the transmittance of light through the liquid crystal display is modulated.

Even when the orientation of the liquid crystal molecules is the same, the polarization of the transmitted light changes responding to the incident direction of the light into the liquid crystal display. Thus, the transmittance of light through the liquid crystal display changes corresponding to the incident direction. The display characteristics of the liquid crystal display depends on the angle of view of the observer. When the view point of the observer is at an angle with respect to the major direction of the angle of view of the liquid crystal display which corresponds to the parallel axis of the liquid crystal molecules disposed in the middle portion in the liquid crystal layer, the inversion of luminance occurs. The inversion of luminance is a phenomenon in which the luminance or transmittance of light of the liquid crystal display when a predetermined voltage is applied between the electrodes is higher than the luminance of the liquid crystal display when a voltage higher than the predetermined voltage is applied. Specifically, the inversion of luminance when a high voltage is applied for the black display mode becomes an important problem to be solved, with respect to the quality of the image of the liquid crystal displays.

In the above-mentioned conventional active matrix twisted nematic liquid crystal display, the electric field is applied perpendicular to the surface of the substrates. However, to solve the above-mentioned problems, a method for applying electric fields parallel to surface of substrates of the liquid crystal display, which is called "In-Plane Switching type", is proposed in, for example, Publication Gazette of Examined Japanese Patent Application Sho 63-21907 or Publication Gazette of Unexamined Japanese Patent Application Hei 6-160878.

Figure 6:
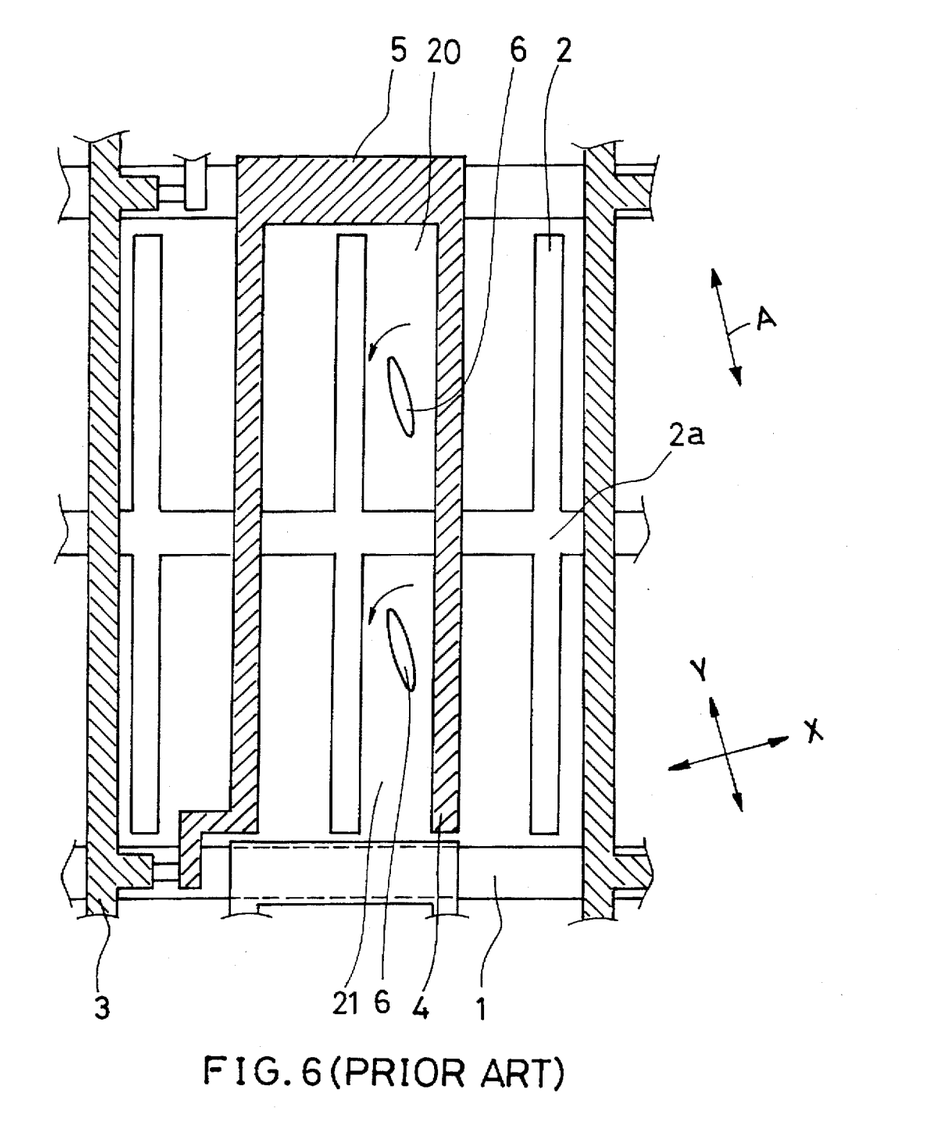
FIG.6 is the plan view showing the configuration of one pixel on the thin film transistor array substrate of the conventional active matrix liquid crystal display.

A thin film transistor (TFT) portion on an array substrate of the conventional lateral electric field type active matrix liquid crystal display is shown in FIG.6. As shown in FIG.6, a plurality of scanning wirings 1 and a plurality of signal wirings 3 are formed to cross at right angles. A plurality of, for example, two pixel electrodes 4 are formed between the adjoining two signal wirings 3 corresponding to one pixel. A plurality of, for example, three common electrodes 2 are respectively formed between the signal wirings 3 and the pixel electrode 4 and between the two adjoining pixel electrodes 4. A capacitive accumulation portion 5 is formed between the pixel electrodes 4 and above the scanning wiring 1. The pixel electrodes 4 and the common electrodes 2 are parallel to the signal wirings 3. Thus, the orientations of the liquid crystal molecules 6 in regions 20 and 21, which are formed between the pixel electrodes 4 and the common electrodes 2 and disposed on both sides of the center wiring portion 2a of the common electrodes 2, are substantially the same.

Figure 7:
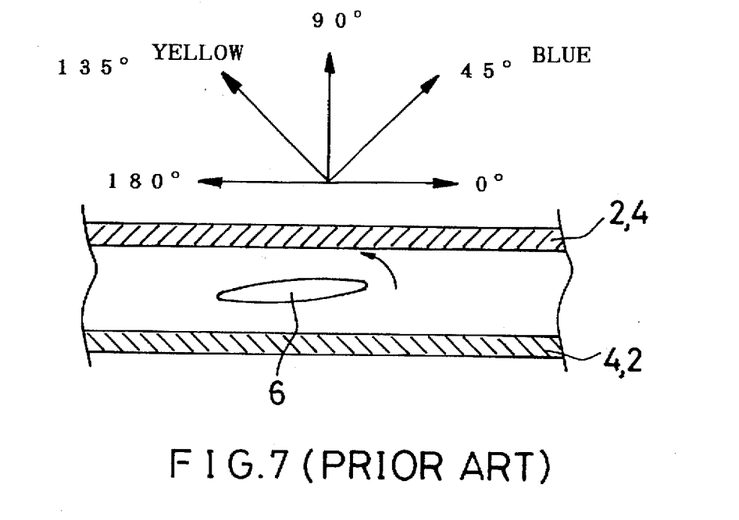
FIG.7 is the schematic plan view showing the principle of occurrence of the coloring of the image corresponding to the angle of view.

In the above-mentioned In-Plane Switching type active matrix liquid crystal display, the display characteristics of the angle of view with respect to the inversion of luminance are splendid. However, when the observer observes the liquid crystal display from the direction crossing at 45 degrees or 135 degrees against the lengthwise direction of the common electrodes 2 and the pixel electrodes 4, the image is colored blue or yellow as shown in FIG.7. This phenomenon is a problem to be solved in the quality of the image of the liquid crystal display.

SUMMARY OF THE INVENTION

An objective of this invention is to provide an active matrix liquid crystal display of lateral electric field type, in which the liquid crystal display can display a high quality image having a large angle of view and multiple tones, the liquid crystal display has a simple configuration that can be produced by the conventional processes, and the coloring of the image corresponding to the angle of view of the observer can be compensated.

The active matrix liquid crystal display of this invention comprises an array substrate, an opposing substrate facing the array substrate, a liquid crystal layer disposed between the array substrate and the opposing substrate, and two polarizing plates disposed outside the array substrate and the opposing substrate. On the array substrate, a plurality of parallel signal wirings and a plurality of parallel scanning wirings are arranged for forming a matrix of pixels. At least one switching device is formed at the crossing point of the signal wiring and the scanning wiring with respect to one pixel. A plurality of pixel electrodes connected to the switching device and a plurality of common electrodes are formed substantially parallel to each other and between the adjoining two signal wirings or adjoining two scanning wirings that form one pixel.

One pixel defined by two adjoining signal wirings and two adjoining scanning wirings is divided into a plurality of display regions. One display region is defined between an adjoining common electrode and pixel electrode. When electric fields which are substantially parallel to the array substrate and the opposing substrate are applied, the orientation of the liquid crystal molecules moves along the direction of the electric fields. In this invention, a group of (first) display regions where the orientation of the liquid crystal molecules is different from that in another group of (second) display regions is included among the display regions.

Figure 5:
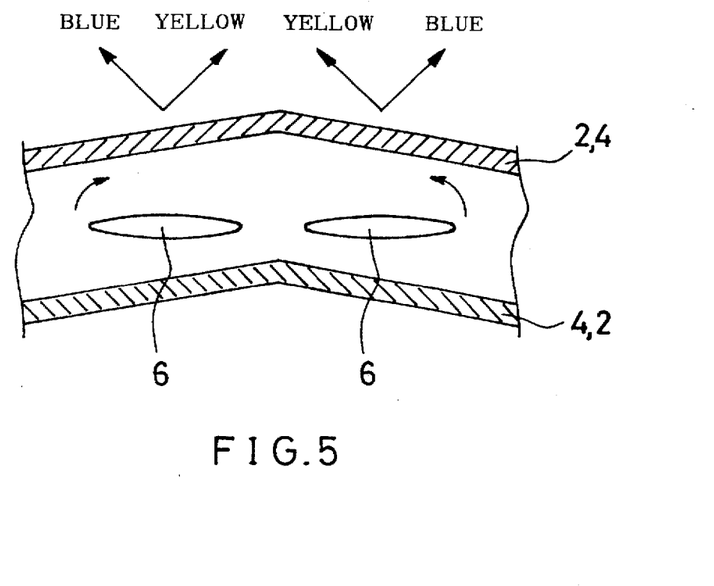
FIG.5 is a schematic plan view showing the principle for compensating the coloring of image corresponding to the angle of view in the active matrix liquid crystal display of this invention.

The display characteristics of each display region exhibit the coloring of image corresponding to the angle of view. However, one pixel includes a plurality of display regions having different display characteristics. As shown in FIG. 5, for example, the direction of coloring of yellow and the direction of coloring of blue superimpose on each other. Thus, the coloring of yellow is compensated by the coloring of blue. As a result, the active matrix liquid crystal display of this invention can display an image without coloring due to the angle of view of the observer. Especially, when the areas of the first and second display regions are formed substantially equal, the coloring of the image corresponding to the angle of view can be compensated completely.

A voltage for generating the electric fields is applied between the common electrodes and the pixel electrodes. The orientation of the liquid crystal molecules moves to orient along the direction of the electric field. When the pixel electrodes and the common electrodes are respectively formed to have inclined portions which are not parallel to the signal wirings and the scanning wirings, the direction of the electric fields generated between the inclined portions corresponds to the inclination or the inclined portions. By selecting the shape of the pixel electrodes and the common electrodes, the orientation of the liquid crystal molecules in the display region formed between the pixel electrode and the common electrode can be controlled desirably. Preferably, the pixel electrodes and the common electrodes are formed in a substantially herringbone shape. By such a configuration, the inclinations of the electrodes are symmetrical with respect to the inflection points of the herringbone shape. When the above-mentioned first display region is defined as the display region disposed at one side of the inflection points and the second display regions as disposed at the other side, the coloring corresponding to the angle of view can completely be compensated.

Alternatively, it is possible that one group off the signal wirings and the scanning wirings is formed substantially parallel to the pixel electrodes and the common electrodes, and these wirings and electrodes are formed to have inclined portions with respect to the other group which is not parallel to the pixel electrodes and the common electrodes. By such a configuration, substantially the same effects as the above-mentioned case can be obtained. Furthermore, total area of non-display regions defined by the adjoining signal wiring or scanning wiring and the common electrode can be reduced in comparison with the case that no group of the signal wirings and the scanning wirings is parallel to the pixel electrodes and the common electrodes. Furthermore, it is preferable that one group of the signal wirings and the scanning wirings, the pixel electrodes and the common electrodes are formed to be substantially herringbone in shape.

When the anisotropic permittivity of the liquid crystal molecules is positive and an angle θ of the orientation of the liquid crystal molecules with respect to the lengthwise direction of the pixel electrodes and the common electrodes satisfies the formula $0°<\theta\leq30°$, the discrepancy between the orientation of the liquid crystal molecules and the polarizing axes of the polarizing plates can be made smaller. As a result, the modulation efficiency can be made higher than 80%. Alternatively, when the anisotropic permittivity of the liquid crystal molecules is negative and an angle θ of the orientation of the liquid crystal molecules with respect to the lengthwise direction of the pixel electrodes and the common electrodes satisfies the formula $60°\leq\theta<90°$, the discrepancy between the orientation of the liquid crystal molecules and the polarizing axes of the polarizing plates can be made smaller.

DETAILED DESCRIPTION OF THE INVENTION

FIRST EMBODIMENT

Figure 1:
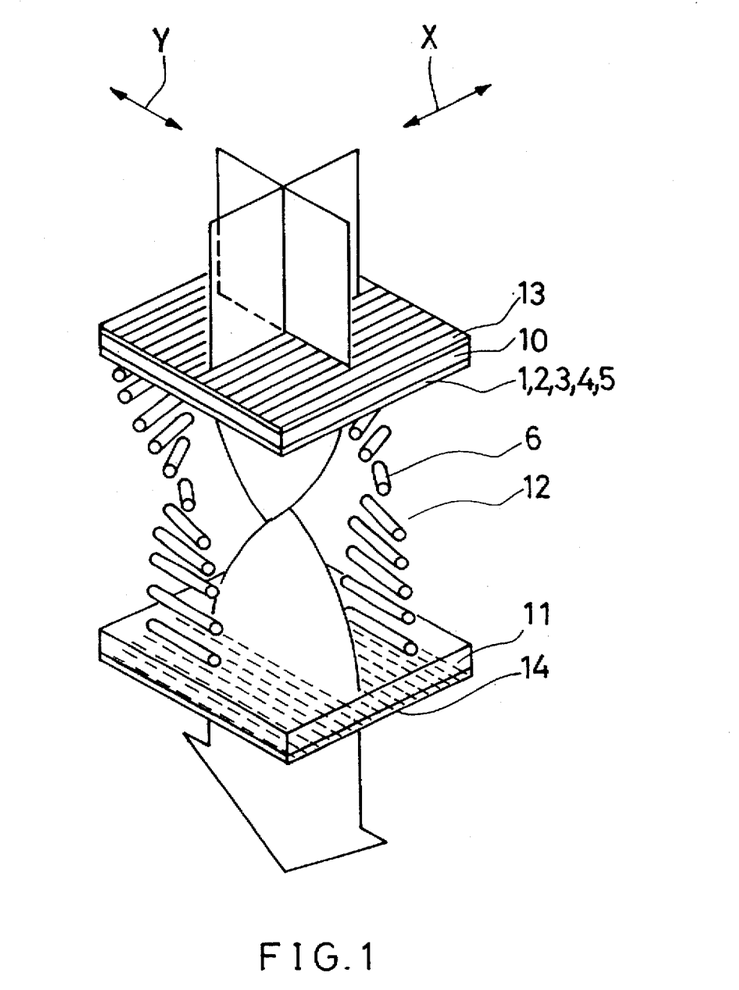
FIG.1 is a perspective view showing a common configuration off embodiments of an active matrix liquid crystal display of this invention.
Figure 2:
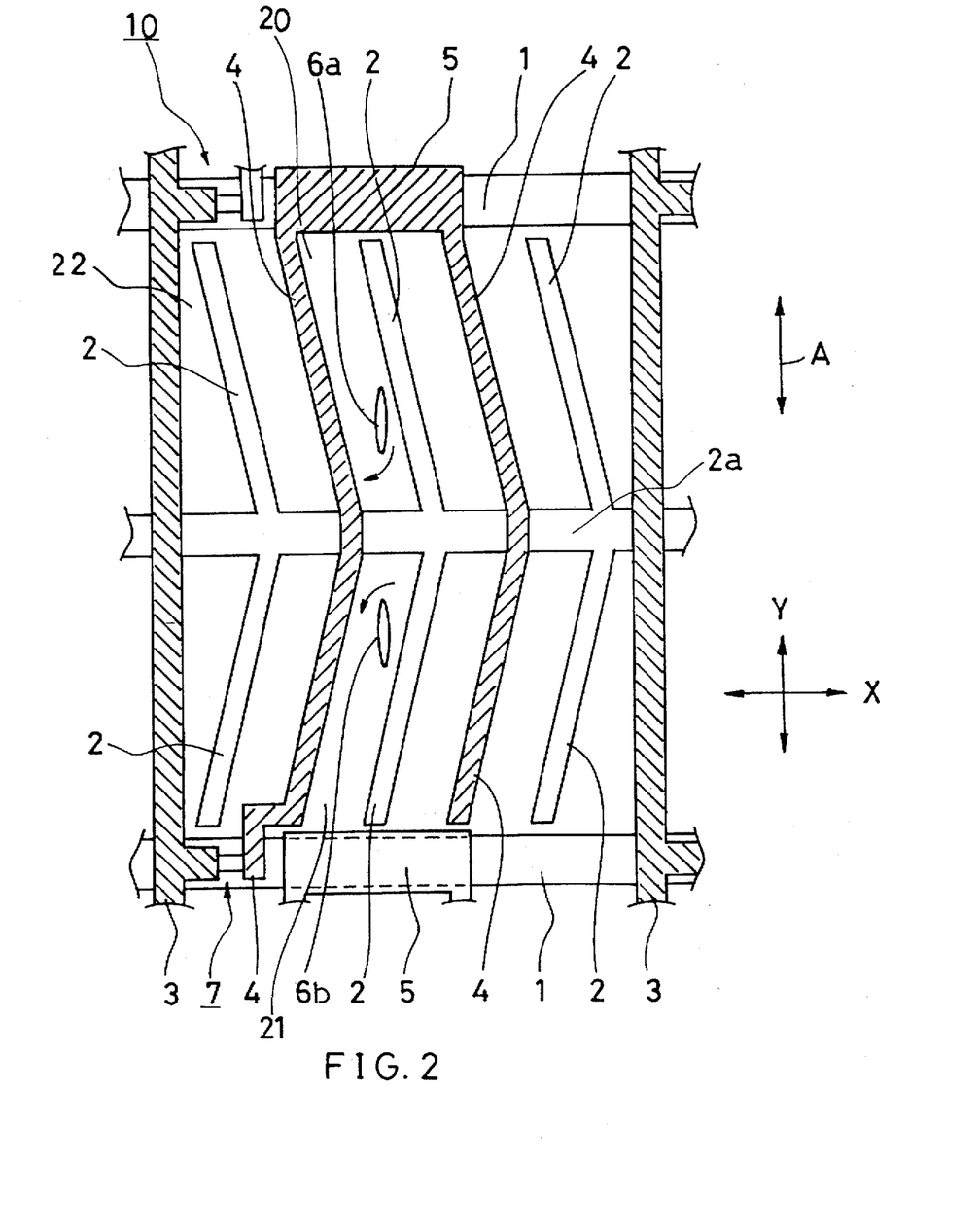
FIG.2 is a plan view showing a configuration of one pixel on a thin Film transistor array substrate of a first embodiment of the active matrix liquid crystal display of this invention.

A first embodiment of an active matrix liquid crystal display of this invention is described referring to FIGS. 1, 2 and 5.

As shown in FIG. 1, the active matrix liquid crystal display of this invention comprises a thin film transistor array substrate 10 (herein after abbreviated as array substrate), an opposing substrate 11 disposed for facing the array substrate 10, a liquid crystal layer 12 disposed between the array substrate 10 and the opposing substrate 11, and two polarizing plates 13 and 14 respectively disposed outside the array substrate 10 and the opposing substrate 11. The polarizing plates 13 and 14 are disposed in a manner so that polarizing axes X and Y cross at right angles.

As shown in FIG.2, the array substrate 10 comprises a plurality of parallel signal wirings 3 and a plurality of parallel scanning wirings 1 which are arranged in a manner to form a matrix of pixels, at least one switching device 7 formed at a cross point of the signal wiring 3 and the scanning wiring 1 in each pixel, a plurality of, for example, two pixel electrodes 4 respectively connected to the switching device 7 via a capacitive accumulation portion 5, and a plurality of, for example, three common electrodes 2.

In the first embodiment shown in FIG. 2, the scanning wirings 1, which are made of, for example, chromium, are formed parallel to each other with predetermined gaps on the array substrate 10 by a photolithography method. The common electrodes 2, which have a herringbone shape, are disposed between two adjoining scanning wirings 1. The common electrodes 2 are respectively bent at their center portions and connected to each other by a center wiring portion 2a. The width of the common electrodes 2 is about 4 μm. The material of the common electrodes 2 is selected from a group of chromium, aluminum, a metal alloy including aluminum as a main component, and so on. It is possible that the configuration of the common electrodes 2 is not only a single layer film but also a multilayer film.

A first insulation layer (not shown in the figure) made of a material such as silicon nitride (SiNx) is formed on the scanning wirings 1 and the common electrodes 2. The first insulation layer serves as a gate insulation film of the thin Film transistor which corresponds to the switching device 7. A semiconductor layer (not shown in the figure) made of a material such as amorphous silicon (α- Si) is laminated on the first insulation layer by plasma CVD method. The semiconductor layer provides for a switching operation of the thin film transistor. The signal wirings 3 are formed parallel to each other and crossing the scanning wirings 1 at right angles on the semiconductor layer. The signal wirings 3 are formed by processes of depositing two layers of titanium and aluminum on the semiconductor layer by a sputtering method and patterning by a dry etching method.

The pixel electrodes 4 are respectively formed substantially parallel to and between two adjoining common electrodes 2. The pixel electrodes 4 have a herringbone shape. The width of the pixel electrodes 4 is about 4 μm. The material of the pixel electrodes 4 is selected from the group of titanium, aluminum, and other conductive metals. It is possible that the configuration of the pixel electrodes 4 is not only a single layer film but also a multilayer film. The capacitive accumulation portion 5 connecting two pixel electrodes 4 is formed above the scanning wiring 1 via the first insulation layer and the semiconductor layer. The capacitive accumulation portion 5 holds a voltage applied to the pixel. Gaps between the common electrodes 2 and the pixel electrodes 4 are about 12 μm.

Orientation films are spread on surfaces of the array substrate 10 configured above and the opposing substrate 11. The orientation films are rubbed in a direction shown by arrow A in FIG.2. The array substrate 10 and the opposing substrate 11 are connected with a spacer of 3 μm. A liquid crystal having a positive anisotropic permittivity is filled between the array substrate 10 and the opposing substrate 11. Furthermore, the polarizing plates 13 and 14 are respectively disposed outside of the array substrate 10 and the opposing substrate 11 in a manner so that the polarizing axes X and Y cross at right angles to each other.

As shown in FIG.2, the common electrodes 2 and the pixel electrodes 4 are respectively bent about at 5 degrees in a herringbone shape bent at the center portions (inflection points) with respect to the direction parallel to the signal wirings 3. Thus, when a voltage is applied between the common electrodes 2 and the pixel electrodes 4, the direction of the electric fields generated between adjoining common electrode 2 and pixel electrode 4 is substantially perpendicular to the lengthwise direction of these electrodes 2 and 4. When electric fields are applied between the common electrode 2 and pixel electrode 4, the orientation of the liquid crystal molecules 6a and 6b in the first and second display regions 20 and 21 respectively move or rotate along the direction of the electric fields. The orientation of the liquid crystal molecules 6a in first display regions 20, which are disposed above the center wiring portion 2a in the figure, is opposite to that of the liquid crystal molecules 6b in second display regions 21 disposed below the center wiring portion 2a. The areas of the first and second display regions 20 and 21 are substantially the same. As shown in FIG.5, the direction of coloring for yellow overlaps the direction of coloring for blue. The coloring of image corresponding to the angle of view can be compensated. Thus, an image with no coloring at any direction can be obtained.

Hereupon, the angle of inclination of the common electrodes 2 and the pixel electrodes 4 which corresponds to the rotation angle θ0 of the major axes of the liquid crystal molecules 6a and 6b is considered. When the angle θ0 is increased, a threshold value of the voltage for rotating the orientation of the liquid crystal molecules 6a and 6b becomes smaller. However, a discrepancy between the polarizing axes of the polarizing plates 13 and 14 and the orientation of the liquid crystal molecules 6a and 6b occurs. As a result, the modulation efficiency of the liquid crystal display decreases. If the angle θ becomes larger than 30 degrees, the modulation efficiency suddenly decreases. When the angle θ is smaller than 30 degrees, the modulation efficiency is maintained at more than 80%, and the liquid crystal display is usable. When the angle θ is 0 degree, the directions of the rotation of the liquid crystal molecules 6a and 6b are not defined when the voltage is applied between the common electrodes 2 and the pixel electrodes 4. Thus, it is preferable that the angle θ of the orientation of the liquid crystal molecules 6a and 6b satisfies the formula $0°<θ≦30°$.

Alternatively, when a liquid crystal having negative anisotropic permittivity is used, it is preferable that the angle θ of the orientation of the liquid crystal molecules 6a and 6b satisfies the formula $60°≦θ<90°$, since substantially the same result can be obtained.

When the liquid crystal display of the first embodiment having the above-mentioned configuration was produced and driven for displaying images, it was found that the liquid crystal display had a wide view angle and the image was not colored corresponding to the angle of view.

SECOND EMBODIMENT

Figure 3:
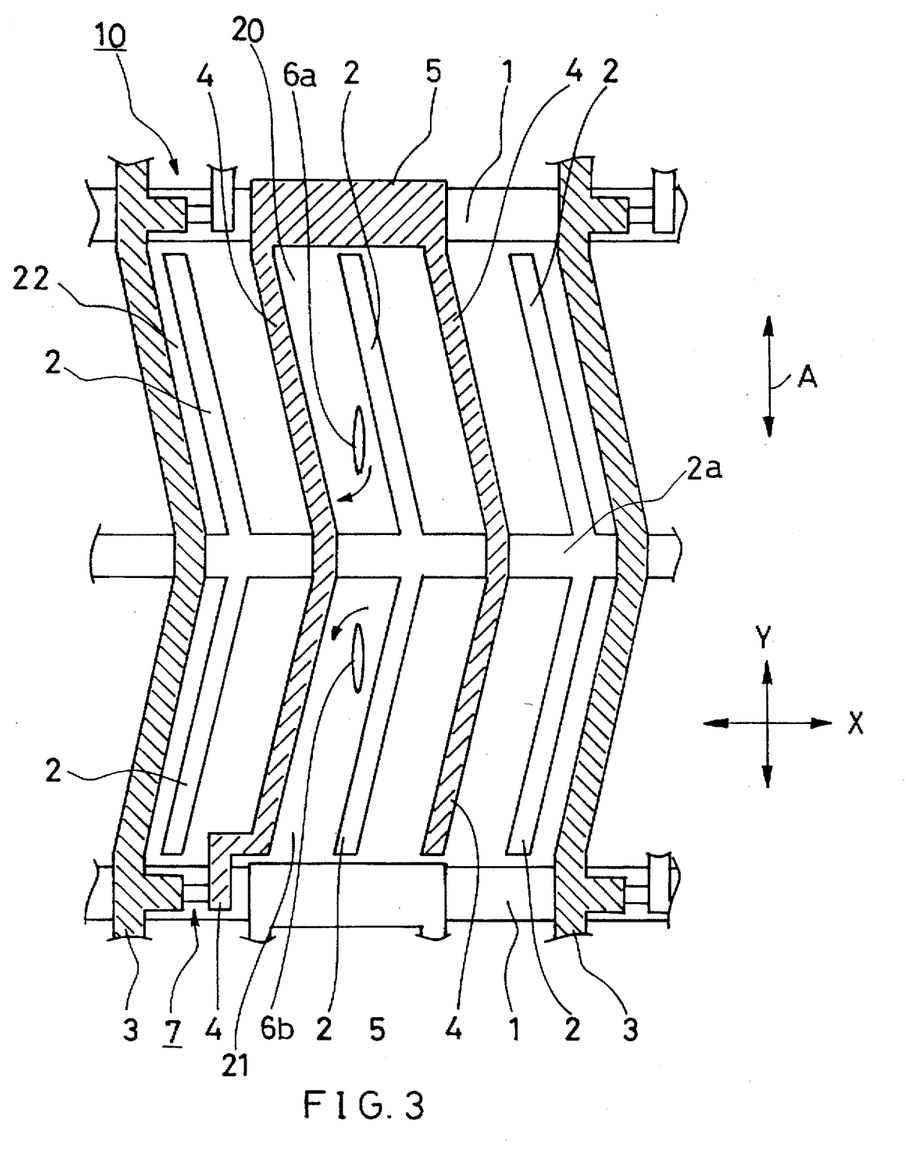
FIG.3 is a plan view showing a configuration of one pixel on a thin film transistor array substrate of a second embodiment of the active matrix liquid crystal display of this invention.

A second embodiment of an active matrix liquid crystal display of this invention is described referring to FIG.3. Explanation of the configuration common with the above-mentioned first embodiment is omitted.

In the second embodiment shown in FIG. 3, the signal wirings 3 are parallel to the common electrodes 2 and the pixel electrodes 4 and formed in a substantially herringbone shape. By such a configuration, the total area of non-display regions 22 formed between the signal wirings 3 and the common electrodes 2 can be made smaller that that in the first embodiment. As a result, a ratio of opening area, which is defined by a ratio of total area of display regions against total area of one pixel, can be increased. When the liquid crystal display of the second embodiment was produced and driven for displaying images, it was found that the liquid crystal display had a wide view angle and the image was not colored corresponding to the angle of view.

THIRD EMBODIMENT

Figure 4:
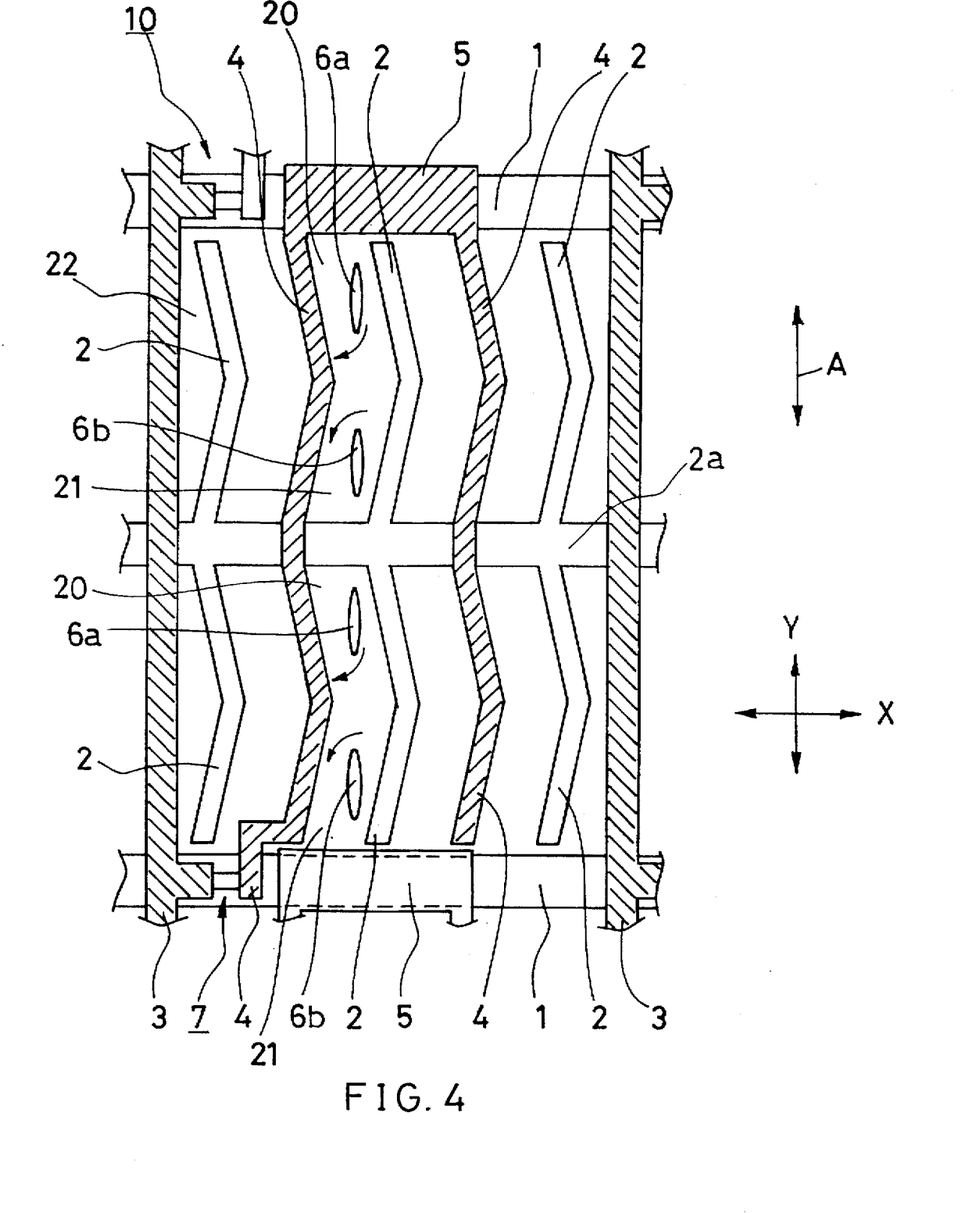
FIG.4 is a plan view showing a configuration of one pixel on a thin film transistor array substrate on a third embodiment of the active matrix liquid crystal display of this invention.

A third embodiment of an active matrix liquid crystal display of this invention is described referring to FIG.4. Explanation of the configuration common with the above-mentioned first and second embodiments is omitted.

In the third embodiment shown in FIG.4, a plurality of regions 20 and 21 where the orientation of the liquid crystal molecules are different from each other are formed above and below the center wiring portion 2a in the figure and between the common electrodes 2 and the pixel electrodes 4. The common electrodes 2 and the pixel electrodes 4 are respectively multiply, for example twice, bent into herringbone shapes. By such a configuration, the total area of the non-display regions 22 between the signal wirings 8 and the common electrodes 2 can be made much smaller than that in the first embodiment. As a result, a ratio of opening area, which is defined by a ratio of total area of display regions against total area of one pixel, can be increased. When the liquid crystal display of the second embodiment was produced and driven for displaying images, it was found that the liquid crystal display had a wide view angle and the image was not colored corresponding to the angle of view.

The invention may be embodied in other specific forms without departing from the spirit and scope thereof. The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. An active matrix liquid crystal display comprising:
    an array substrate having a plurality of parallel signal wirings and a plurality of parallel scanning wirings which are arranged to form a matrix of pixels, at least one switching device provided at a crossing point of the signal wiring and the scanning wiring in each pixel, a plurality of pixel electrodes connected to the switching device, and a plurality of common electrodes;
    an opposing substrate disposed for facing the array substrate;
    a liquid crystal layer disposed between the array substrate and the opposing substrate; and
    two polarizing plates disposed outside the array substrate and the opposing substrate; wherein
    each pixel defined by two adjoining signal wiring and two adjoining scanning wiring is divided into a plurality of display regions which are respectively defined by adjoining common electrode and pixel electrode;
    wherein the pixel electrodes and the common electrodes are substantially parallel to each other and respectively have inclined portions that are not parallel to the signal wirings and the scanning wirings, and
    the display regions include at least a group of first display regions where the orientation of the liquid crystal molecules is different from that in another group of second display regions when electric fields which are substantially parallel to the array substrate and the opposing substrate are applied.

2. The active matrix liquid crystal display in accordance with claim 1, wherein areas of the first and second display regions are substantially equal.

3. The active matrix liquid crystal display in accordance with claim 1, wherein the pixel electrodes and the common electrodes are formed in a substantially herringbone shape.

4. The active matrix liquid crystal display in accordance with claim 1, wherein one group selected from the signal wirings and the scanning wirings is formed substantially parallel to the pixel electrodes and the common electrodes and the pixel and common electrodes have inclined portions with respect to the other group that is not parallel to the pixel electrodes and the common electrodes.

5. The active matrix liquid crystal display in accordance with claim 4, wherein one group selected from the signal wirings and the scanning wirings, the pixel electrodes and the common electrodes have a substantially herringbone shape.

6. The active matrix liquid crystal display in accordance with claim 1, wherein anisotropic permittivity of the liquid crystal molecules is positive and an angle θ of the orientation of the liquid crystal molecules with respect to the lengthwise direction of the pixel electrodes and the common electrodes satisfies the formula $0°<θ≦30°$.

7. The active matrix liquid crystal display in accordance with claim 2, wherein anisotropic permittivity of the liquid crystal molecules is positive and an angle θ of the orientation of the liquid crystal molecules with respect to the lengthwise direction of the pixel electrodes and the common electrodes satisfies the formula $0°<θ≦30°$.

8. The active matrix liquid crystal display in accordance with claim 3, wherein anisotropic permittivity of the liquid crystal molecules is positive and an angle θ of the orientation of the liquid crystal molecules with respect to the lengthwise direction of the pixel electrodes and the common electrodes satisfies the formula $0°<θ≦30°$.

9. The active matrix liquid crystal display in accordance with claim 4, wherein anisotropic permittivity of the liquid crystal molecules is positive and an angle θ of the orientation of the liquid crystal molecules with respect to the lengthwise direction of the pixel electrodes and the common electrodes satisfies the formula $0°<θ≦30°$.

10. The active matrix liquid crystal display in accordance with claim 5, wherein anisotropic permittivity of the liquid crystal molecules is positive and an angle θ of the orientation of the liquid crystal molecules with respect to the lengthwise direction of the pixel electrodes and the common electrodes satisfies the formula $0°<θ≦30°$.

11. The active matrix liquid crystal display in accordance with claim 1, wherein anisotropic permittivity of the liquid crystal molecules is negative and an angle θ of the orientation of the liquid crystal molecules with respect to the lengthwise direction of the pixel electrodes and the common electrodes satisfies the formula $60°≦θ<90°$.

12. The active matrix liquid crystal display in accordance with claim 2, wherein anisotropic permittivity of the liquid crystal molecules is negative and an angle θ of the orientation of the liquid crystal molecules with respect to the lengthwise direction of the pixel electrodes and the common electrodes satisfies the formula $60°≦θ<90°$.

13. The active matrix liquid crystal display in accordance with claim 3, wherein anisotropic permittivity of the liquid crystal molecules is negative and an angle θ of the orientation of the liquid crystal molecules with respect to the lengthwise direction of the pixel electrodes and the common electrodes satisfies the formula $60°≦θ<90°$.

14. The active matrix liquid crystal display in accordance with claim 4, wherein anisotropic permittivity of the liquid crystal molecules is negative and an angle θ of the orientation of the liquid crystal molecules with respect to the lengthwise direction of the pixel electrodes and the common electrodes satisfies the formula $60° \leq \theta < 90°$.

15. The active matrix liquid crystal display in accordance with claim 5, wherein anisotropic permittivity of the liquid crystal molecules is negative and an angle $\theta$ of the orientation of the liquid crystal molecules with respect to the lengthwise direction of the pixel electrodes and the common electrodes satisfies the formula $60° \leq \theta < 90°$.

* * * * *